(12) United States Patent
Pinera

(10) Patent No.: US 8,572,948 B1
(45) Date of Patent: Nov. 5, 2013

(54) ROCKET ENGINE PROPULSION SYSTEM

(75) Inventor: Alex Pinera, Jupiter, FL (US)

(73) Assignee: Florida Turbine Technologies, Inc., Jupiter, FL (US)

( * ) Notice: Subject to any disclaimer, the term of this patent is extended or adjusted under 35 U.S.C. 154(b) by 678 days.

(21) Appl. No.: 12/905,274

(22) Filed: Oct. 15, 2010

(51) Int. Cl.
*F02K 9/50* (2006.01)
*F02K 9/64* (2006.01)

(52) U.S. Cl.
USPC .................. 60/246; 60/211; 60/257; 60/267; 60/221; 239/127.1

(58) Field of Classification Search
USPC ........... 60/211, 213, 214, 215, 217, 221, 246, 60/257, 266, 267; 239/127.1
See application file for complete search history.

(56) References Cited

U.S. PATENT DOCUMENTS

| | | | | |
|---|---|---|---|---|
| 2,395,113 A | * | 2/1946 | Goddard | 60/259 |
| 3,417,563 A | * | 12/1968 | Loprete | 60/39.27 |
| 5,417,049 A | * | 5/1995 | Sackheim et al. | 60/260 |
| 7,418,814 B1 | * | 9/2008 | Greene | 60/204 |
| 2008/0016846 A1 | * | 1/2008 | Spadaccini | 60/267 |
| 2008/0264372 A1 | * | 10/2008 | Sisk et al. | 123/144 |
| 2012/0144797 A1 | * | 6/2012 | Dobek et al. | 60/244 |

* cited by examiner

*Primary Examiner* — Phutthiwat Wongwian
*Assistant Examiner* — Steven Sutherland
(74) *Attorney, Agent, or Firm* — John Ryznic

(57) ABSTRACT

A rocket propulsion system having a liquid fuel tank and a liquid oxidizer tank, where a liquid inert gas tank supplies liquid inert gas to a liquid inert gas pump driven by a turbine of the engine to pressurize the liquid inert gas, which is passed through a heat exchanger around the nozzle to vaporize the inert gas, that is then used to pressurize the liquid oxidizer tank so that a liquid oxidizer pump is not needed, or to pressurize both the liquid oxidizer tank and the liquid fuel tank so that a liquid oxidizer pump and a liquid fuel pump are not needed in the rocket engine.

11 Claims, 6 Drawing Sheets

US 8,572,948 B1

ROCKET ENGINE PROPULSION SYSTEM

GOVERNMENT LICENSE RIGHTS

None.

CROSS-REFERENCE TO RELATED APPLICATIONS

None.

BACKGROUND OF THE INVENTION

1. Field of the Invention

The present invention relates generally to a rocket engine, and more specifically to a rocket engine without the need for a liquid oxygen pump.

2. Description of the Related Art including information disclosed under 37 CFR 1.97 and 1.98

Rocket engines produce thrust by the expulsion of a high-speed fluid exhaust. This fluid is nearly always a gas which is created by high pressure (10-200 bar) combustion of solid or liquid propellants, consisting of fuel and oxidizer components, within a combustion chamber. The fluid exhaust is then passed through a propelling nozzle which typically uses the heat energy of the gas to accelerate the exhaust to very high speed, and the reaction to this pushes the engine in the opposite direction.

In rocket engines, high temperatures and pressures are highly desirable for good performance as this permits a longer nozzle to be fitted to the engine, which gives higher exhaust speeds, as well as giving better thermodynamic efficiency. Rocket propellant is mass that is stored, usually in some form of propellant tank, prior to being ejected from a rocket engine in the form of a fluid jet to produce thrust.

Chemical rocket propellants are most commonly used, which undergo exothermic chemical reactions which produce hot gas which is used by a rocket for propulsive purposes. Liquid-fueled rockets typically pump separate fuel and oxidizer components into the combustion chamber, where they mix and burn. Hybrid rocket engines use a combination of solid and liquid or gaseous propellants. Both liquid and hybrid rockets use injectors to introduce the propellant into the combustion chamber.

For a rocket engine to be propellant efficient, it is important that the maximum pressures possible be created on the walls of the chamber and nozzle by a specific amount of propellant; as this is the source of the thrust. This can be achieved by all of: heating the propellant to as high a temperature as possible (using a high energy fuel, containing hydrogen and carbon and sometimes metals such as aluminum, or even using nuclear energy); using a low specific density gas (as hydrogen rich as possible); or using propellants which are, or decompose to, simple molecules with few degrees of freedom to maximize translational velocity.

There are several cycles of rocket engines and these include the gas generator cycle, the expander cycle, the staged combustion cycle, and the pressure fed cycle. FIG. 1 shows the gas generator cycle rocket engine. The gas generator cycle is a power cycle of a bipropellant rocket engine. Some of the propellant is burned in a gas-generator 11 and the resulting hot gas is used to power the engine's pumps by driving a turbine 12, where the turbine 12 drives a fuel pump 13 and an oxidizer pump 14. The gas is then exhausted. Because something is "thrown away" this type of engine is also known as open cycle. There are several advantages to the gas generator cycle over its counterpart, the staged combustion cycle. The gas generator turbine does not need to deal with the counter pressure of injecting the exhaust into the combustion chamber. This allows the turbine to produce more power and increase the pressure of the fuel and combustion chamber, thus increasing specific impulse or efficiency; this also reduces wear on the turbine, increasing its reliability, reducing its production cost and increasing its operational life-span (particularly advantageous for reusable rockets).

The main disadvantage is lost efficiency due to discarded propellant, though this efficiency loss can be outweighed in production engines by the higher chamber pressure's increase in net efficiency. Even so a gas generator cycle tends to have lower specific impulse than a staged combustion cycle.

As in most cryogenic rocket engines, some of the fuel in a gas-generator cycle is used to cool the nozzle 15 and combustion chamber 16. Current construction materials cannot stand extreme temperatures of rocket combustion processes by themselves. Cooling permits the use of rocket engines for relatively longer periods of time with today's material technology. Without rocket combustion chamber and nozzle cooling, the engine would fail catastrophically.

The expander cycle is a power cycle of a bipropellant rocket engine meant to improve the efficiency of fuel delivery. FIG. 2 shows the expander cycle rocket engine. In an expander cycle rocket engine, the fuel is heated before it is combusted, usually with waste heat from the main combustion chamber 16. As the liquid fuel passes through coolant passages in the walls of the combustion chamber 16, it undergoes a phase change into a gaseous state. The fuel in the gaseous state expands through a turbine 12 using the pressure differential from the supply pressure to the ambient exhaust pressure to initiate turbopump rotation. This can provide a bootstrap starting capability as is used on the Pratt & Whitney RL10 engine. This bootstrap power is used to drive turbines that drive the fuel and oxidizer pumps 13 and 14 increasing the propellant pressures and flows to the rocket engine thrust chamber. After leaving the turbine(s), the fuel is then injected with the oxidizer into the combustion chamber 16 and burned to produce thrust for the vehicle.

Because of the necessary phase change, the expander cycle is thrust limited by the square-cube rule. As the size of a bell-shaped nozzle 15 increases with increasing thrust, the nozzle surface area (from which heat can be extracted to expand the fuel) increases as the square of the radius. However, the volume of fuel that must be heated increases as the cube of the radius. Thus, there exists a maximum engine size of approximately 300 kN of thrust beyond which there is no longer enough nozzle area to heat enough fuel to drive the turbines and hence the fuel pumps. Higher thrust levels can be achieved using a bypass expander cycle where a portion of the fuel bypasses the turbine and or thrust chamber cooling passages and goes directly to the main chamber injector. Aerospike engines do not suffer from the same limitations because the linear shape of the engine is not subject to the square-cube law. As the width of the engine increases, both the volume of fuel to be heated and the available thermal energy increase linearly, allowing arbitrarily wide engines to be constructed. All expander cycle engines need to use a cryogenic fuel such as hydrogen, methane, or propane that easily reach their boiling points.

Some expander cycle engine may use a gas generator of some kind to start the turbine and run the engine until the heat input from the thrust chamber and nozzle skirt increases as the chamber pressure builds up.

In an open cycle, or "bleed" expander cycle, only some of the fuel is heated to drive the turbines, which is then vented to atmosphere to increase turbine efficiency. While this increases power output, the dumped fuel leads to a decrease in propellant efficiency (lower engine specific impulse). A closed cycle expander engine sends the turbine exhaust to the combustion chamber.

The staged combustion cycle, also called topping cycle or pre-burner cycle, is a thermodynamic cycle of bipropellant rocket engines. FIG. 3 shows the staged cycle rocket engine. Some of the propellant is burned in a pre-burner 11 and the resulting hot gas is used to power the engine's turbines 12 and pumps 13 and 14. The exhausted gas is then injected into the main combustion chamber 16, along with the rest of the propellant, and combustion is completed.

The advantage of the staged combustion cycle is that all of the engine cycles' gases and heat go through the combustion chamber 16, and overall efficiency essentially suffers no pumping losses at all. Thus this combustion cycle is often called 'closed cycle' since the cycle is closed as all propellant products go through the chamber; as opposed to open cycle which dumps the turbopump driving gases, representing a few percent of loss.

Another very significant advantage that staged combustion gives is an abundance of power which permits very high chamber pressures. Very high chamber pressures mean high expansion ratio nozzles can be used, whilst still giving ambient pressures at takeoff. These nozzles give far better efficiencies at low altitude.

The disadvantages of this cycle are harsh turbine conditions, that more exotic plumbing is required to carry the hot gases, and that a very complicated feedback and control design is necessary. In particular, running the full oxidizer stream through both a pre-combustor and main-combustor chamber ("oxidizer-rich" staged combustion) produces extremely corrosive gases. Thus most staged-combustion engines are fuel-rich. Staged combustion engines are the most difficult types of rocket engines to design. A simplified version is called the gas-generator cycle.

The pressure-fed cycle is a class of rocket engine designs. FIG. 4 shows a pressure fed rocket engine. A separate gas supply 21, usually helium, pressurizes the propellant tanks to force fuel and oxidizer to the combustion chamber 16. To maintain adequate flow, the tank pressures must exceed the combustion chamber pressure.

Pressure fed rocket engines have simple plumbing and lack complex and often unreliable turbo-pumps. A typical startup procedure begins with opening a valve, often a one-shot pyrotechnic device, to allow the pressurizing gas to flow through check valves into the propellant tanks. Then the propellant valves in the engine itself are opened. If the fuel and oxidizer are hypergolic, they burn on contact; non-hypergolic fuels require an igniter. Multiple burns can be conducted by merely opening and closing the propellant valves as needed. They can be operated electrically, or by gas pressure controlled by smaller electrically operated valves.

Care must be taken, especially during long burns, to avoid excessive cooling of the pressurizing gas due to adiabatic expansion. Cold helium won't liquefy, but it could freeze a propellant, decrease tank pressures, or damage components not designed for low temperatures. The Apollo Lunar Module descent propulsion system was unusual in storing its helium in a supercritical but very cold state. It was warmed as it was withdrawn through a heat exchanger from the ambient temperature fuel.

Pressure-fed engines have practical limits on propellant pressure, which in turn limits combustion chamber pressure. High pressure propellant tanks require thicker walls and stronger alloys which make the vehicle tanks heavier. Thereby reducing performance and payload capacity. The lower stages of launch vehicles often use solid fuel and pump-fed liquid fuel engines instead, where high pressure ratio nozzles are considered desirable.

BRIEF SUMMARY OF THE INVENTION

A rocket engine that uses liquid nitrogen (or another inert gas) to pressurize the liquid oxygen within the LOX tank so that the LOX pump can be eliminated which therefore will increase the engine reliability and or safety. Elimination of the LOX pump also eliminates the inter-propellant seal. The liquid nitrogen supplied to the LOX tank can be used in the gas generator, expander or staged combustion cycle rocket engines.

In another embodiment, liquid helium is used to pressurize both the liquid hydrogen tank and the liquid oxygen tank in which both the fuel and oxidizer pumps are eliminated. A pre-burner drives a turbine which drives the liquid helium pump to pressurize the liquid helium that is supplied to both the fuel and oxidizer tanks to pressurize the liquid contained therein. Liquid helium is used for this embodiment in order to not freeze in the liquid hydrogen tank as would the liquid nitrogen.

DETAILED DESCRIPTION OF THE INVENTION

Figure 1:
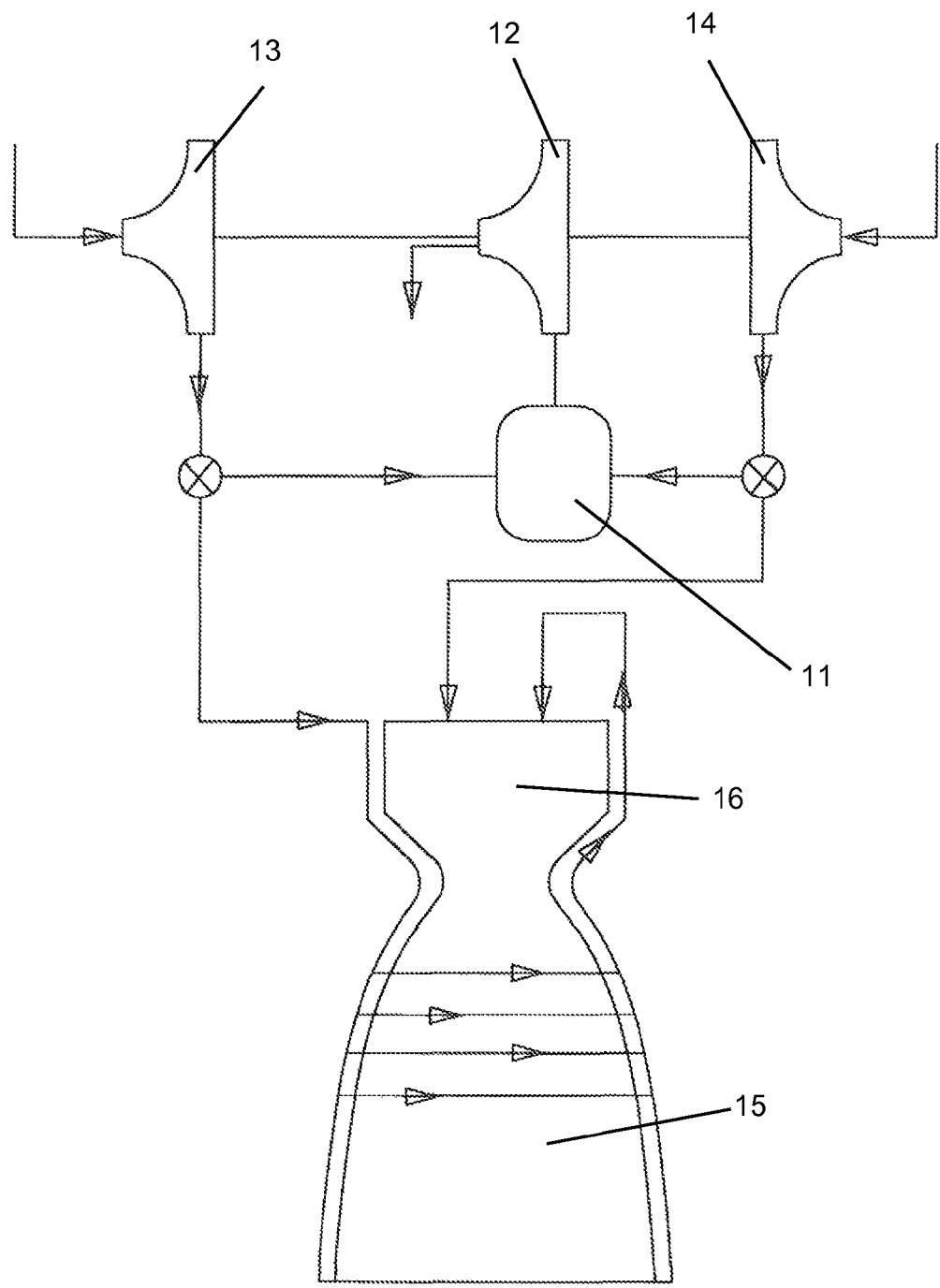
FIG. 1 shows a schematic view of a prior art gas generator cycle rocket engine.
Figure 2:
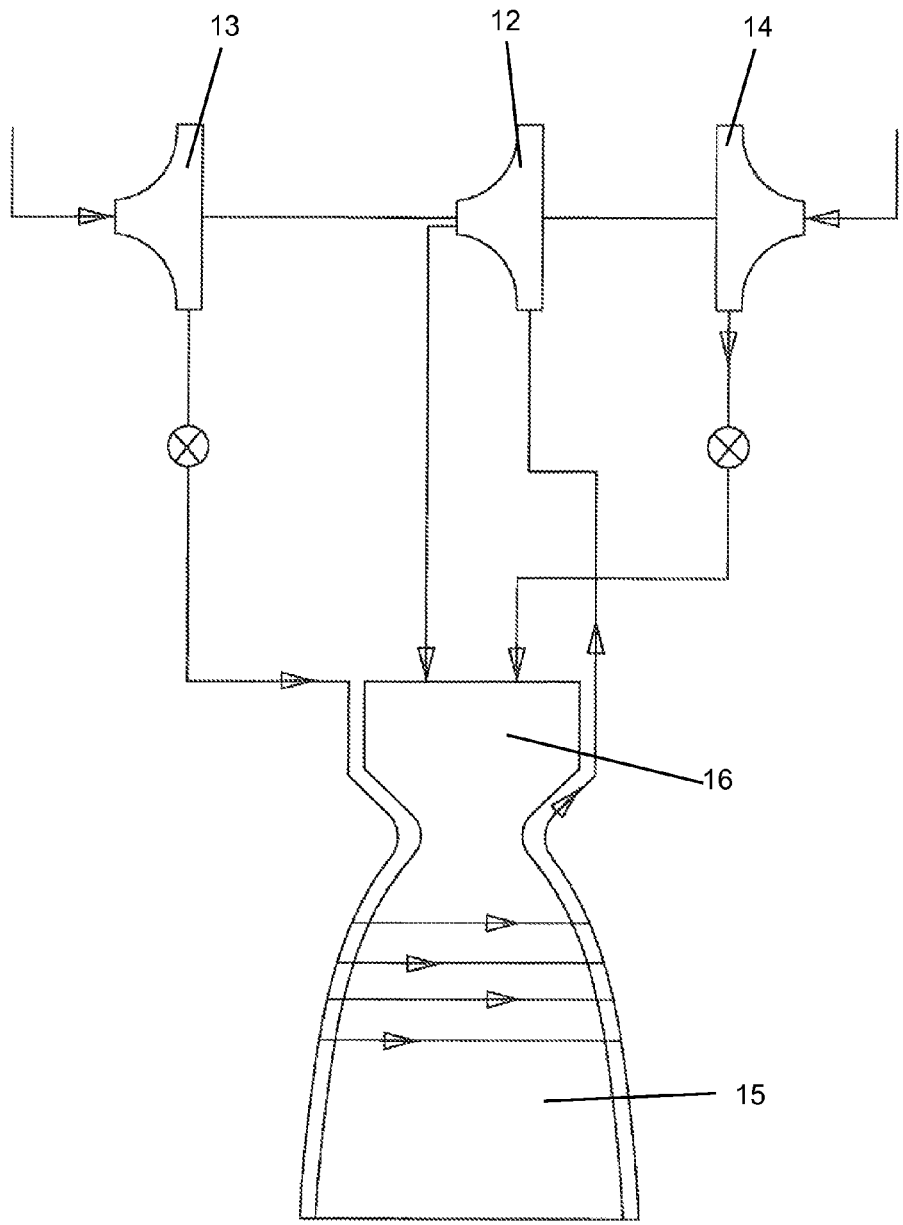
FIG. 2 shows a schematic view of a prior art expander cycle rocket engine.
Figure 3:
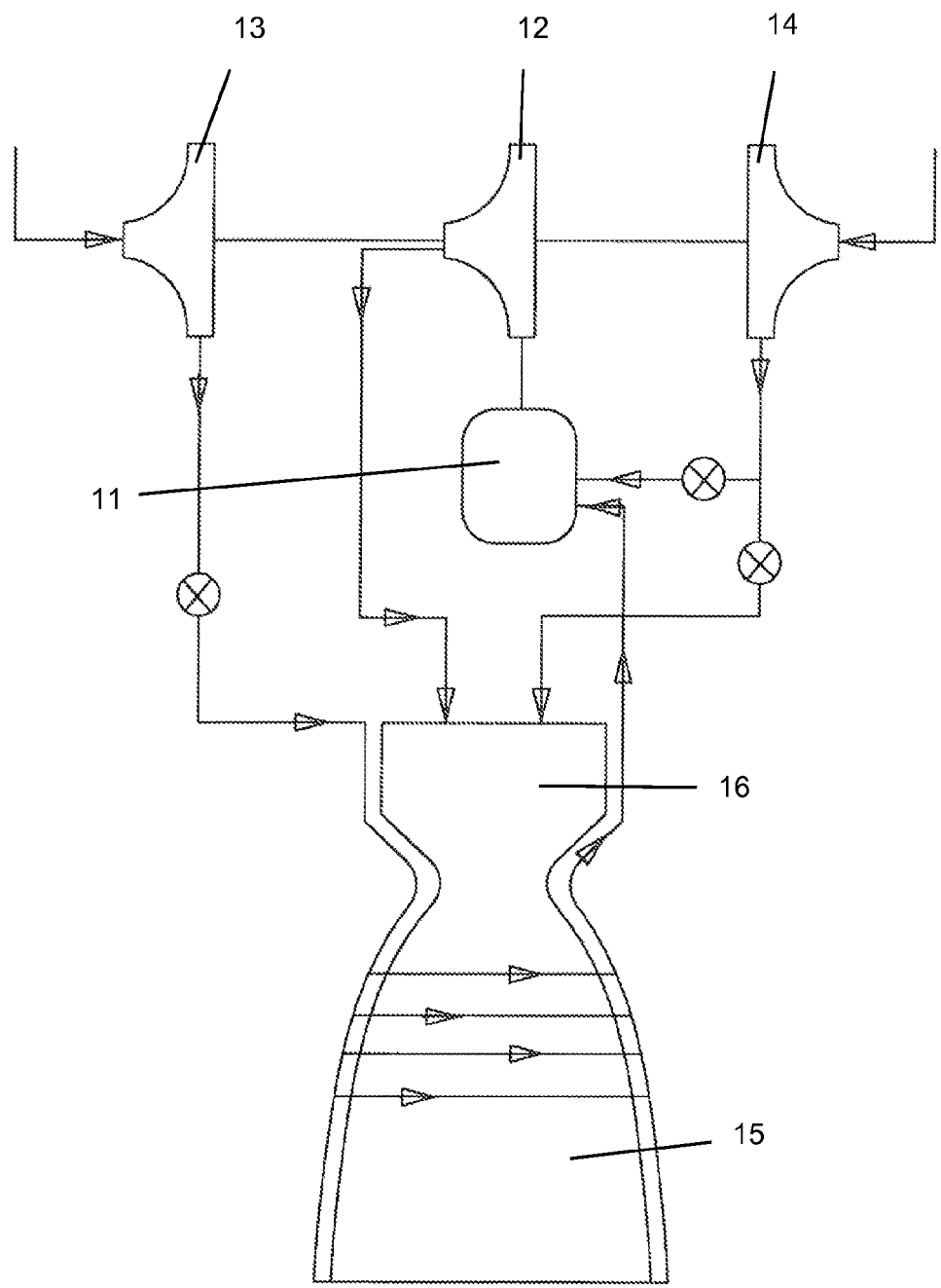
FIG. 3 shows a schematic view of a prior art staged combustion cycle rocket engine.
Figure 4:
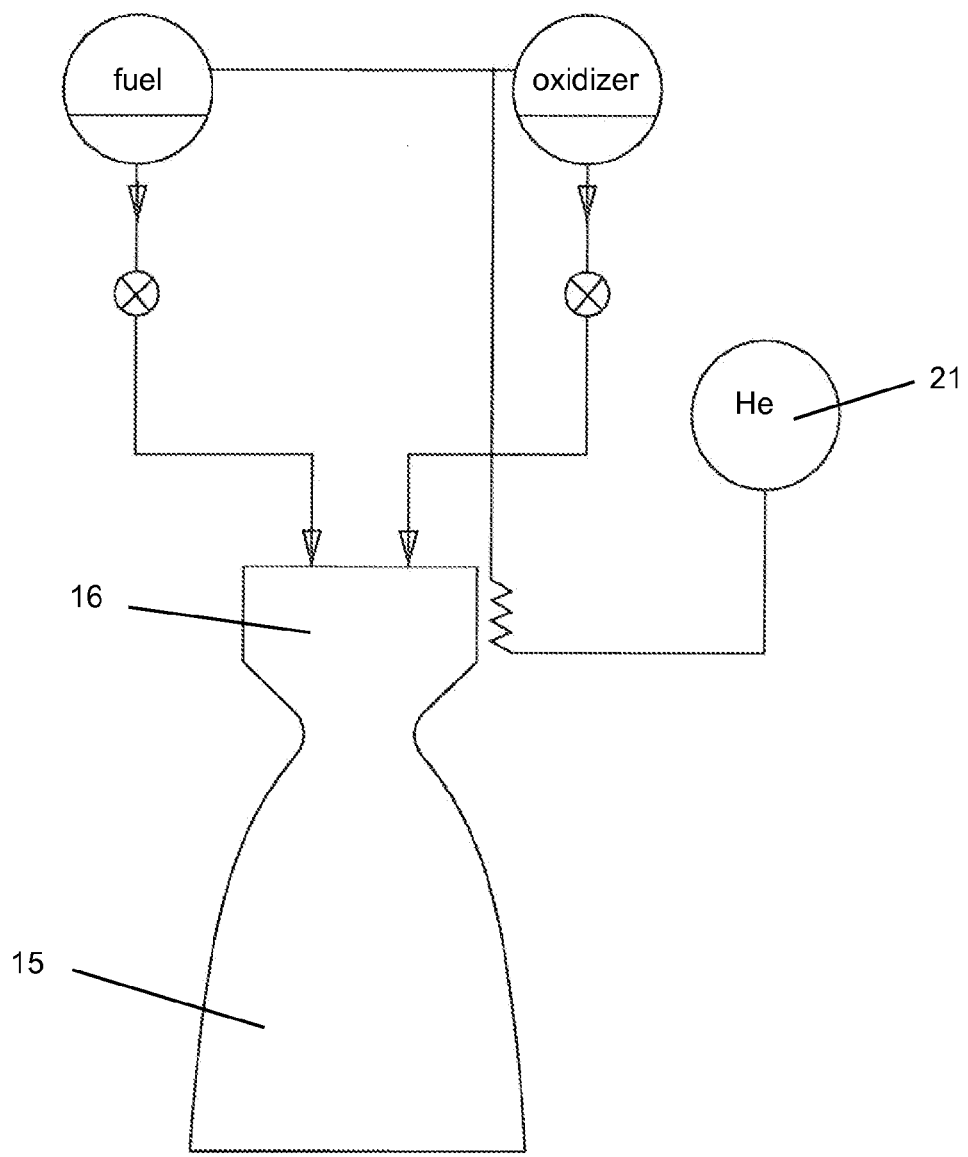
FIG. 4 shows a schematic view of a prior art pressure fed rocket engine.
Figure 5:
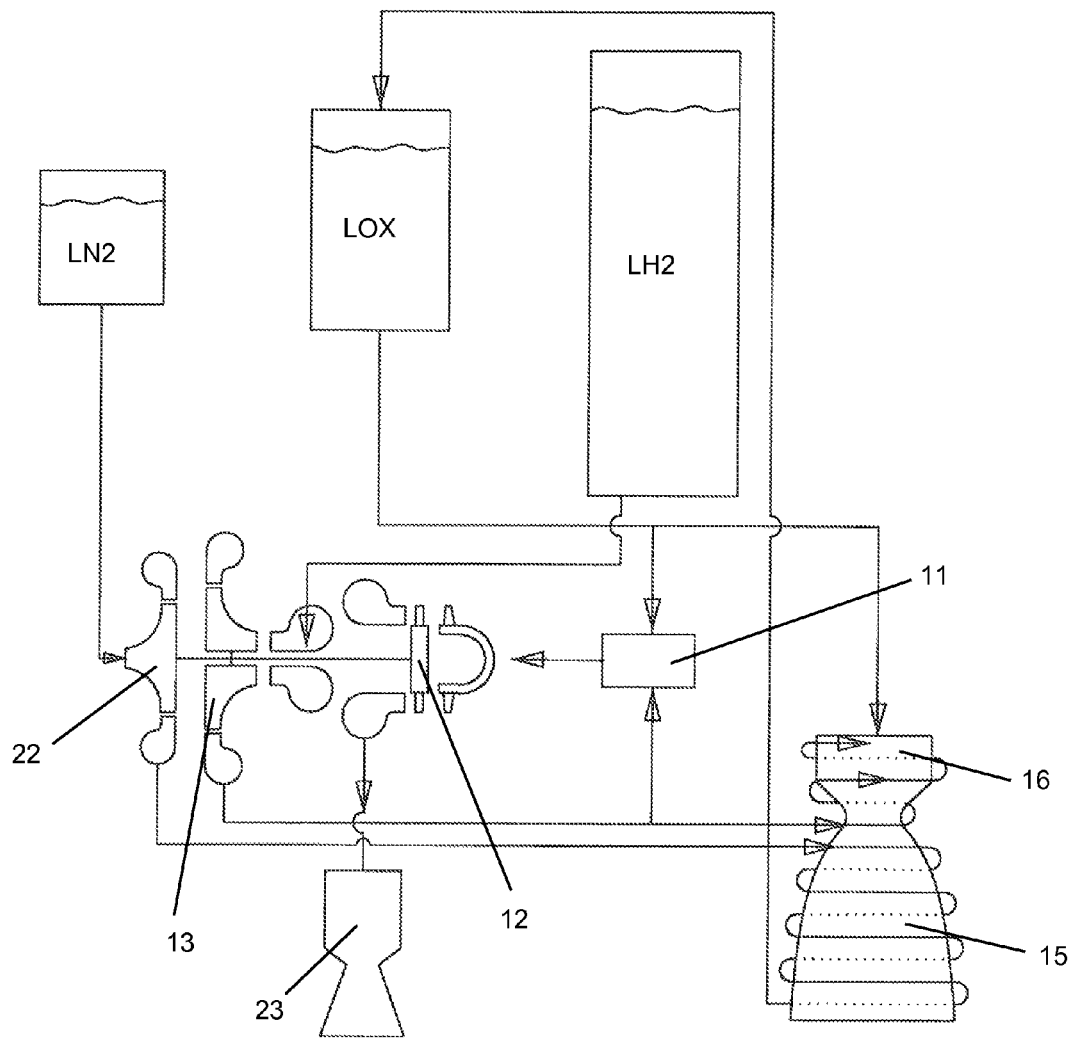
FIG. 5 shows a schematic view of a first embodiment of the rocket engine of the present invention that uses a liquid hydrogen pump.
Figure 6:
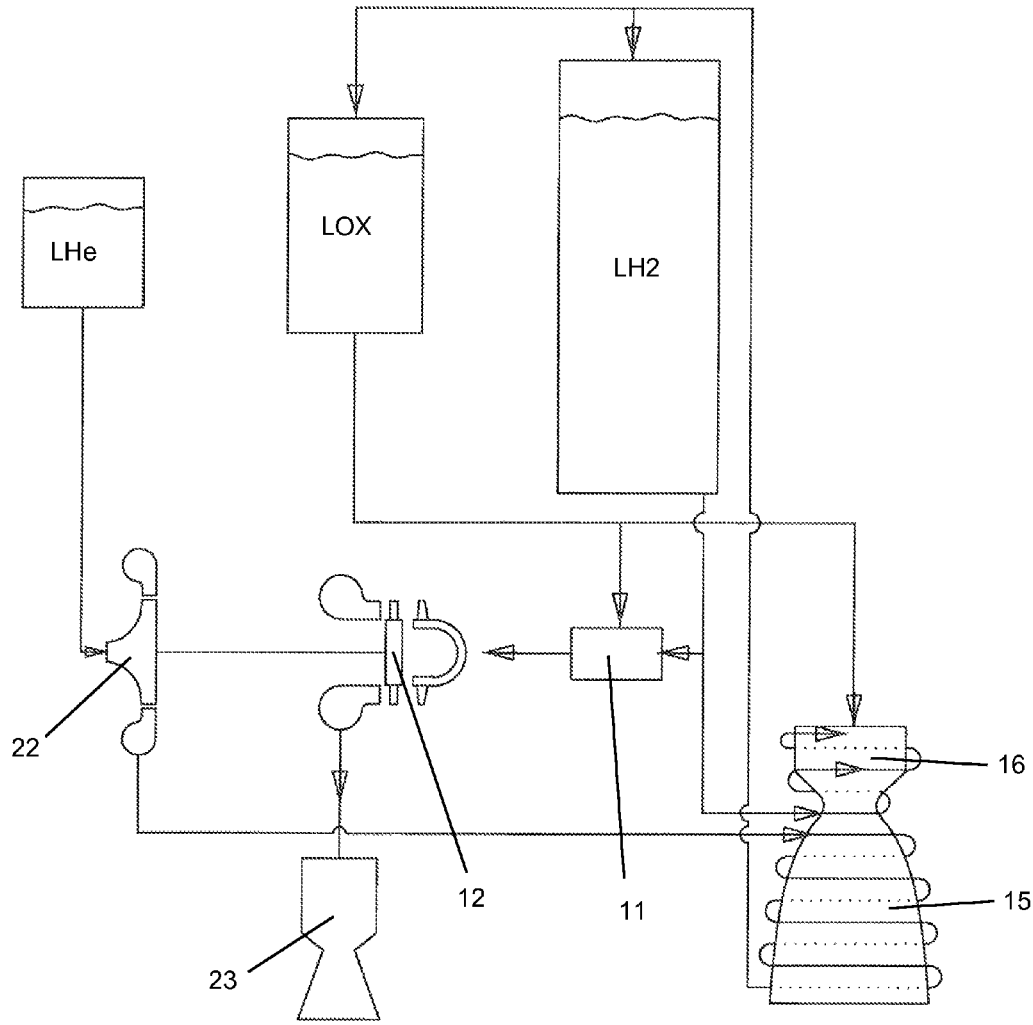
FIG. 6 shows a schematic view of a second embodiment of the rocket engine of the present invention which eliminates the liquid hydrogen pump.

The rocket propulsion system of the present invention is shown in two embodiments in FIGS. 5 and 6 for the gas generator cycle rocket engine. In this engine, the liquid oxygen (or LOX) pump is eliminated and the LOX tank is pressurized by liquid nitrogen that is pressurized by its own pump. However, the two embodiments of the present invention can also be used in the expander cycle and the staged combustion cycle rocket engines.

FIG. 5 shows the gas generator cycle rocket engine of the present invention with a liquid nitrogen tank (LN2), a LOX tank (LOX) and a liquid hydrogen tank (LH2). The engine includes a liquid nitrogen pump 22 connected to a rotor shaft with a liquid hydrogen pump 13 and a turbine 12 that drives both pumps 22 and 13. A gas generator 11 receives LOX from the tank and LH2 from the LH2 pump 13 to create a hot gas stream that is passed through the turbine 12 to drive the two pumps 22 and 13.

The liquid nitrogen is pumped by the pump 13 and then passes through the heat exchanger formed around the nozzle 15 to produce nitrogen vapor, which is then delivered to pressurize the LOX tank. The pressurized LOX is then delivered to the combustion chamber 16 of the rocket engine. The liquid hydrogen from the tank is passed into the pump 13 where it is pressurized and then delivered to the heat exchanger around the combustor 16 to form a vapor and then discharged into the combustion chamber 16. The exhaust from the turbine 12 is delivered to a small nozzle 23 to generate additional thrust for the rocket.

FIG. 6 shows another embodiment of the rocket engine in which the LOX pump and the liquid hydrogen pump are both eliminated and the LOX tank (LOX) and the liquid hydrogen tank (LH2) are both pressurized by an inert gas that is pressurized by the inert gas pump 22. For this embodiment, the inert gas is helium since the nitrogen would freeze in the liquid hydrogen tank (LH2). The fuel and the oxidizer are both supplied from the two tanks into the pre-burner 11 to generate a hot gas stream that drives the turbine 12. The inert gas pump 22 is driven by the turbine 12 to pressurize the inert gas (in this case, liquid Helium). The pressurized inert gas is then passed through the heat exchanger around the main combustion chamber or the nozzle to produce a vapor that is then supplied to both tanks to pressurize both the fuel and the oxidizer. The pressurized fuel and oxidizer is then delivered to the pre-burner and to the main combustion chamber 16 to produce thrust.

In either of the two embodiments of FIGS. 5 and 6, the inert gas and the fuel and/or oxidizer can be passed through any of the heat exchangers formed around the main combustion chamber and the nozzle.

I claim the following:

1. A rocket propulsion system comprising:
   a liquid fuel tank;
   a liquid oxidizer tank;
   a main combustion chamber and a nozzle;
   a heat exchanger associated with the main combustion chamber or the nozzle;
   a liquid inert gas tank;
   a liquid inert gas pump having an inlet connected to the inert gas tank and an outlet connected to the heat exchanger;
   the heat exchanger having an outlet connected to the oxidizer tank;
   a turbine connected to drive the liquid inert gas pump; and,
   the liquid inert gas pump pressurizing the liquid inert gas and the heat exchanger vaporizing the liquid inert gas and increasing the pressure of the oxidizer in the oxidizer tank.

2. The rocket propulsion system of claim 1, and further comprising:
   a pre-burner having an inlet connected to the fuel tank and the oxidizer tank and an outlet connected to the turbine.

3. The rocket propulsion system of claim 1, and further comprising:
   a fuel pump having an inlet connected to the liquid fuel tank and an outlet connected to the main combustion chamber passing through the heat exchanger; and,
   the turbine connected to drive both the liquid inert gas pump and the fuel pump.

4. The rocket propulsion system of claim 1, and further comprising:
   the rocket engine is without a fuel pump; and,
   the outlet of the heat exchanger is also connected to the fuel tank to pressurize the liquid fuel.

5. The rocket propulsion system of claim 4, and further comprising:
   the liquid inert gas is helium.

6. The rocket propulsion system of claim 2, and further comprising:
   the liquid fuel tank is directly connected to the pre-burner.

7. The rocket propulsion system of claim 2, and further comprising:
   the liquid fuel tank is connected to the pre-burner through the liquid fuel pump.

8. A process for operating a rocket propulsion system, the rocket propulsion system including a liquid fuel tank and a liquid oxidizer tank, a main combustion chamber connected to a nozzle, a heat exchanger associated with the nozzle or the main combustion chamber, the process comprising the steps of:
   passing a liquid fuel through the heat exchanger to vaporize the liquid fuel;
   passing a liquid oxidizer through the heat exchanger to vaporize the liquid oxidizer;
   passing the vaporized fuel and oxidizer into the main combustion chamber;
   pressurizing a liquid inert gas;
   passing the liquid inert gas through the heat exchanger to vaporize the liquid inert gas; and,
   passing the vaporized inert gas into the liquid oxidizer tank to pressurize the liquid oxidizer for delivery to the main combustion chamber.

9. The process for operating a propulsion system of claim 8, and further comprising the steps of:
   pressurizing the liquid fuel in a pump and passing the pressurized liquid fuel through the heat exchanger to vaporize the fuel; and,
   passing the pressurized and vaporized fuel into the main combustion chamber.

10. The process for operating a rocket propulsion system of claim 8, and further comprising the step of:
    delivering the vaporized inert gas into the liquid fuel tank to pressurize the liquid fuel for delivery into the main combustion chamber.

11. The process for operating a rocket propulsion system of claim 10, and further comprising the step of:
    using liquid helium as the inert gas so that the liquid hydrogen does not freeze the inert gas.

* * * * *